Oct. 30, 1923. Re. 15,711

A. F. BAKER

DRIVING MECHANISM FOR MOTOR CARS

Original Filed Jan. 28, 1918 2 Sheets-Sheet 1

WITNESS

R. B. Dygert

INVENTOR
ARTHUR F. BAKER
BY White Prout & Evans
ATTORNEYS

Oct. 30, 1923. Re. 15,711

A. F. BAKER

DRIVING MECHANISM FOR MOTOR CARS

Original Filed Jan. 28, 1918 2 Sheets-Sheet 2

INVENTOR
ARTHUR F. BAKER
BY White Prost & Evans
ATTORNEYS

WITNESS
R B Oggert

Reissued Oct. 30, 1923. Re. 15,711

UNITED STATES PATENT OFFICE.

ARTHUR F. BAKER, OF OAKLAND, CALIFORNIA, ASSIGNOR TO THE PERFECTO GEAR DIFFERENTIAL CO., OF SEATTLE, WASHINGTON, A CORPORATION.

DRIVING MECHANISM FOR MOTOR CARS.

Original No. 1,329,319, dated January 27, 1920, Serial No. 214,230, filed January 28, 1918. Application for reissue filed April 16, 1923. Serial No. 632,583.

*To all whom it may concern:*

Be it known that I, ARTHUR F. BAKER, a citizen of the United States, residing at Oakland, county of Alameda, State of California, and formerly of Sedro Woolley, in the county of Skagit and State of Washington, have invented a new and useful Improvement in Driving Mechanism for Motor Cars, of which the following is a specification.

This invention relates to improvements in driving gears for motor vehicles, and the object of this improvement is to provide a unitary variable speed differential gearing that may be used to take the place of the differential mechanism now in common use on motor vehicles and that will either add an additional speed change or permit the separate change speed gears now in common use on motor vehicles to be dispensed with if desired.

A further object is to provide a driving gear of this class that may be applied to a re-built automobile or truck attachment with comparatively few alterations and changes in the original driving mechanism of the automobile.

A still further object is to adapt the variable speed gear for use in connection with a worm drive and to interpose the variable speed gear between the worm gear and the differential mechanism.

A still further object is to provide a driving gear of this nature that is completely housed, that may run in a bath of oil and one that is equally well adapted for use in connection with new, or re-built motor vehicles.

The invention consists in the novel construction, of a change speed gear and the adaptation and combination of such gear with a differental mechanism and worm drive, as will be more clearly hereinafter described and claimed.

Figure 2:
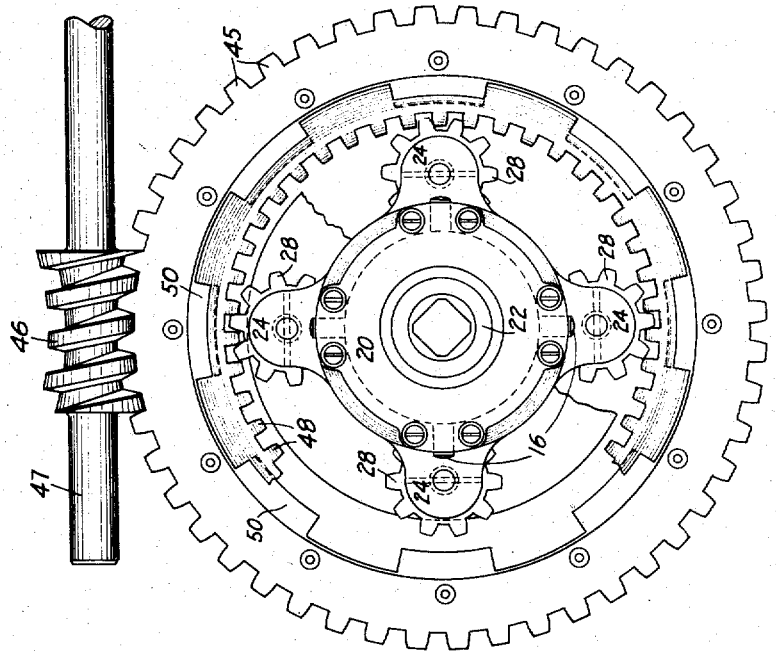
Figure 1:
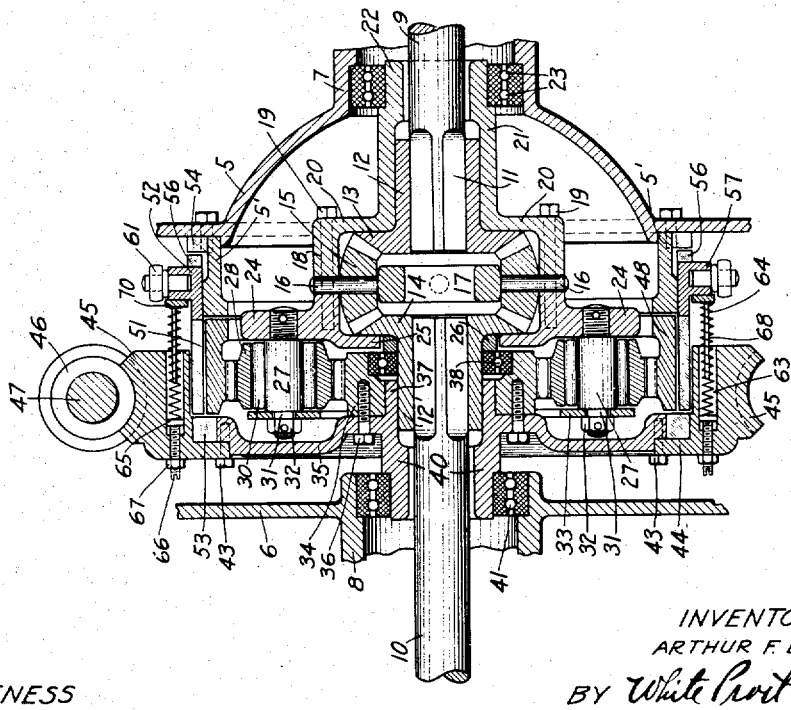
Figure 3:
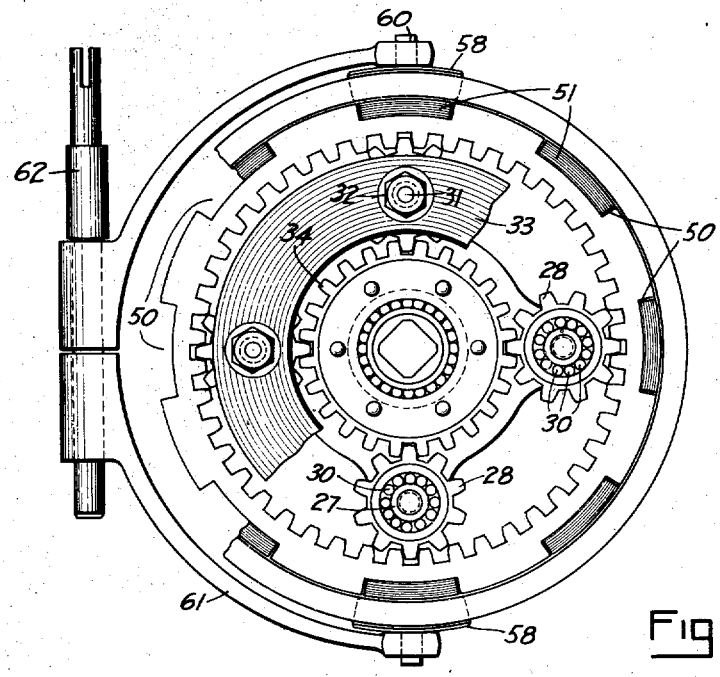
Figure 4:
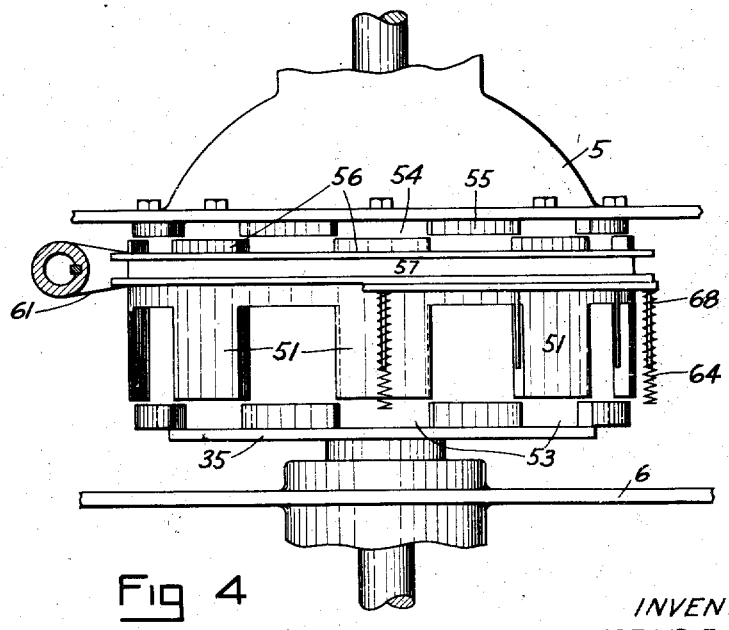

In the drawings, Figure 1 is a view in vertical section of a driving gear constructed in accordance with this invention; Fig. 2 is a view in elevation, with certain parts broken away, of one side of the same as it might appear with the housing removed; Fig. 3 is a view in elevation with certain parts broken away of the side of the gear opposite to that shown in Fig. 2 as it might appear with the housing removed; and Fig. 4 is a view in elevation illustrating parts of the housing and gear shifting mechanism with the gears removed therefrom.

In the present invention I have combined a differential of the type which employs a master ring or casing, with a planetary system of gears, the intermediate gears of the planetary system being connected to turn with, or journaled upon the master ring or casing of the differential, the power being communicated first through one of the other gears of the planetary system and the turning of the remaining gear of the planetary system being controlled, so as to thereby secure a change of speed in the turning of the shafts.

Referring to the drawings, throughout which, like reference numerals indicate like parts, the numerals 5 and 6 indicate the two parts of a fixed rear axle housing, the peripheral portion of which is shown as broken away and 5′ indicates an annular ring that is rigidly secured to the part 5.

The portions 5 and 6 are provided with concentrically arranged, outwardly directed, tubular axle housings 7 and 8 respectively, that extend in a transverse direction to the driving wheels of the truck. Within the axle housings 7 and 8 are disposed the differential axles 9 and 10 whose outer ends connect with the driving wheels of the truck, not shown, and whose inner ends terminate in squared portions 11 that fit within the hubs 12 and 12′ of bevel gears 13 and 14 respectively.

The bevel gears 13 and 14 are spaced apart and are normally adapted to mesh with other bevel gears 15 that are mounted on pins 16 on a spider 17.

The pins 16 of the spider 17 project outwardly through an annular casing 18 so that when the casing 18 is turned the bevel gears 15 will be turned therewith and will drive the gears 13 and 14 in the well known manner common to differential gears of the usual form of construction.

The bevel gears 13, 14, 15 and casing 18 together form a differential of a common construction and are illustrated as being typical of a suitable type of differential.

The differential casing 18 is preferably constructed in two parts that are divided on the line of the pins 16 and are secured together by bolts or screws 19 so that the differential can be assembled. This casing constitutes the master ring of the differential through which power is received and which revolves about the shafts or axles.

The differential casing 18 is formed with a transverse wall 20 that connects with a symmetrically arranged sleeve 21 of lesser diameter than the casing 18 that forms a bearing for the hub portion 12 of the gear wheel 13 and that terminates in a shouldered journal member 22 that is positioned within the end of the axle housing 7 and between which and the axle housing is interposed a ball-bearing 23 of any suitable form of construction.

The differential casing or master ring 18 is provided on the end opposite the wall 20 with four outwardly directed lugs or flange members 24, and with an inwardly directed flange or lip 25 that engages with the rear face of the bevel gear 14 and is spaced from the hub portion 12′ by a packing ring or washer 26.

The lugs 24 are each provided with a removable bearing stud or pin 27 whereon is mounted a pinion 28, roller bearing 30 preferably being interposed between the pinions 28 and studs 27. These pinions 28 constitute the intermediate gears of the planetary system.

The outer ends of the studs 27 are reduced in diameter as at 31, and threaded for the reception of nuts 32, and the outer end of all of such studs are connected with each other by a rigid annular ring 33 that forms a brace and support for the outer ends of the studs.

The pinions 28 are adapted to mesh with a central gear wheel 34 that is secured to an annular plate 35 by bolts 36. This gear 34 is the central or inner gear of the planetary system.

The plate 35 is provided with inwardly directed hub portion 37 that extends over the outer end of the hub portion 12′ and the inner gear 34 is spaced from the hub portion 12′ by a ball bearing 38 that co-operates with the hub portion 37 in forming a journal upon which the disk 35 may rotate.

The disk 35 is also provided with an outwardly directed hub portion 40 that projects within the end of the axle housing 8 and is journaled for rotation therein by a ball bearing 41.

The peripheral portion of the plate 35 is rigidly connected by stud bolts 43 with an inwardly directed annular flange 44 on a worm gear 45 which is the primary driving gear.

The worm gear 45 is adapted to be engaged by a worm 46 on a driving shaft 47 that may be connected directly with a source of power as with the engine of the truck.

48 is an internally toothed gear or ring gear that is disposed within the limits of the worm gear 45 and is adapted to mesh with the four gear wheels 28, as more clearly shown in Figs. 2 and 3. This is the external or ring gear of the planetary swstem.

Within the periphery of the ring gear 48 are formed a plurality of transverse notches 50 that are adapted for the reception of spaced interfitting members 51 on a shiftable clutch ring 52, the arrangement being such that the clutch ring will be caused to rotate with the ring gear 48 but may be moved sidewise with respect thereto.

The disk 35 is provided at a point opposite the ring 52 with a plurality of slots or recesses 53 into which the members 51 may be projected to lock the ring gear 48 to the disk 35 and the fixed housing part 5 is provided with a plurality of similar recesses 54 that are formed between lugs 55 and are adapted for the reception of lugs 56 on the side of the clutch ring 52 opposite the members 51 to lock the ring to the fixed housing and prevent rotation of the ring gear 48.

The clutch ring 52 is provided with an integral grooved shifter collar 57 within which are disposed two oppositely arranged shifter elements 58 that are connected by pins 60 with the ends of two curved shifter arms 61 that extend to and are rigidly secured on a stub shaft 62 that may be journaled in any convenient manner and connected with suitable devices whereby it may be oscillated to shift the ring 52 sidewise and selectively lock the ring gear to the disk 35 or to the fixed housing 5 or to release the ring gear from both the disk 35 and housing 5 thereby affording a neutral position.

The worm gear 45 is provided at a plurality of points with recesses 63 that serve as housings for compression springs 64, the inner ends of which are in engagement with stops 65 that are adjustably supported by screws 66 that are provided with lock nuts 67. The compressive force of the springs may be varied in an obvious manner by adjusting the screws 66.

The outer ends of the springs are disposed around spindles 68 and bear against a ring 70 that frictionally engages the sides of the collar 57, the spindles 68 being fixedly secured to the ring 70.

The springs 64 exert a constant pressure against the ring 70 which pressure is transmitted to the shifter ring 52 and serves at all times to urge the shifter ring to the right as viewed in Fig. 1. This pressure serves to urge the lugs 56 into engagement with the fixed housing and also serves to take up the play of the ring 52 in all of its operative positions.

When the shifter ring 52 is in the position shown in Fig. 1 the gear is in neutral. If the worm gear 45 is driven when the parts are in this position, the inner gear 34 will rotate the pinions 28 which in turn will idly rotate the loosely mounted ring gear 48 and ring 52.

Where the clutch ring 52 is moved so that the members 51 engage within the slots 53 of the plate 35 the plate 35, ring gear 48, pinions 28 and inner gear 34 all rigidly locked together so that there will be no relative rotation between the several gears, and the casing 18 including the differential proper will be rotated with the worm gear 45 thereby forming a direct high speed drive, and, neglecting the action of the differential, rotating the axles 9 and 10 at the same speed as the worm gear 45.

The low speed drive is obtained by shifting the clutch ring element 56 into engagement with the lugs 55 and thereby locking the ring gear 48 to the fixed housing 5.

When the ring gear 48 is locked in a fixed position and the disk 35 is driven, the inner gear 34 will rotate the pinions 28 which will roll on the fixed ring gear and carry the casing 18 with them in the same direction in which the inner gear 34 is rotated but at a much slower speed.

When the device is in use the housing formed by the parts 5 and 6 may be filled with grease so that all of the gears and bearings will be thoroughly lubricated.

It is obvious that changes in the form of construction of the various parts of this device may be resorted to within the scope of the following claims.

What I claim as new, and desire to protect by Letters Patent, is:

1. In a power transmission device in combination, two axles, a differential mechanism through which said axles are driven, a planetary gear system including a ring gear and to which the power is applied, and means for driving the differential through the intermediate gears of the planetary gear system.

2. The combination with a differential gear system of a planetary gear system having its intermediate gears connected to turn with the master ring of the differential, and means for optionally securing one of the other gears of the planetary system to turn with the master ring of the differential or to prevent its turning.

3. The combination with a differential gear system of a planetary gear system having its intermediate gears journaled upon the master ring of the differential, and means for controlling the rotation of one of the other gears of the planetary system.

4. A transmission of the class described comprising differential axles, a differential gear system connected therewith, a driving member, speed reduction gear mechanism interposed between said driving member and said differential gear system, and means for rendering said speed reduction gear mechanism inoperative and establishing a direct driving connection between said driving member and said differential gear system.

5. In a transmission of the class described the combination with differential axles of a differential gear system connected therewith, a fixed housing for said differential gear system, a worm wheel mounted for rotation at the side of said differential gear system, means for driving said worm wheel, a speed reduction gear mechanism interposed between said worm wheel and said differential gear system and means for rendering said speed reduction gear mechanism inoperative and locking said differential gear system to said worm wheel to establish a direct drive.

6. In a transmission of the class described the combination with differential axles, of a differential gear system connected therewith, a fixed housing, a casing for said differential gear system, a disk mounted for rotation within said housing, means for driving said disk, a ring gear disposed beside said disk, a clutch ring connected with the said ring gear and having a neutral position thereon, means for moving said clutch ring, means on said disk adapted to be engaged by said clutch ring to lock said ring gear to said disk, means on said fixed housing adapted to be engaged by said clutch ring to lock said ring gear to said fixed housing, an inner gear fixedly secured to the hub portion of said disk and a plurality of pinions rotatably mounted on said differential casing and adapted to mesh with said ring gear and with said inner gear.

7. A transmission of the class described comprising a differential gear system including a casing, a plurality of pinions rotatably mounted on said casing, a driven gear wheel disposed to engage with the inner peripheral portions of said pinions and in mesh therewith, a ring gear surrounding said pinions and in mesh therewith, a fixed housing, and means for selectively locking said ring gear to said driven gear wheel or said fixed housing.

8. In a transmission of the class described the combination with the differential axles of a motor vehicle of differential gears connected therewith, a fixed housing for the transmission, a casing for said differential gear, a disk rotatably mounted within the fixed housing, a worm wheel secured to the periphery of said disk, a worm in driving engagement with said worm wheel, a ring gear mounted within the said worm wheel, a clutch ring connected with the ring gear and movable sidewise thereof to selectively release said ring gear or to lock said ring gear to said worm or to said fixed housing, an inner gear fixedly secured to the hub portion of said disk, a plurality of pinions rotatably mounted on said differential casing and adapted to mesh with said inner gear and said ring gear, and means for shifting said clutch ring.

9. The combination with a differential gear system of a planetary gear system including a ring gear and having its intermediate gears journaled on the differential casing, a driving gear fixed to the inner gear of the planetary system, a fixed element, and means for locking the ring gear of the planetary system to said fixed element to cause planetation of the intermediate gears or to said driving gear to prevent rotation of said intermediate gears.

10. The combination with a differential gear system of a planetary gear system including a ring gear and having its intermediate gears journaled on the differential casing, a driving gear fixed to the inner gear of the planetary system, a fixed element, clutch teeth on said fixed element and on said driving gear, and complementary clutch teeth on the ring gear of the planetary system optionally engageable with the fixed element or driving gear clutch teeth.

11. The combination with a differential gear system of a planetary gear system including a ring gear and having its intermediate gears journaled on the differential casing, a driving gear fixed to the inner gear of the planetary system, a fixed element, clutch members on said fixed element and on said driving gear, complementary clutch members on the ring gear of the planetary system, and means for optionally engaging the ring gear clutch members with the fixed element or driving gear clutch members.

12. The combination with a differential gear system of a planetary gear system including a ring gear and having its intermediate gears journaled on the differential casing, a driving gear fixed to the inner gear of the planetary system, a fixed element, clutch members on said fixed element and on said driving gear, axially movable complementary clutch members mounted for rotation with the ring gear of the planetary system, and means for axially moving said complementary members to lock the ring gear to the fixed element or to the driving gear.

13. The combination with a differential gear system of a planetary gear system including a ring gear and having its intermediate gears journaled on the differential casing, a driving gear fixed to the inner gear of the planetary system, a housing enclosing both gear systems, clutch members on said housing and on said driving gear, complementary clutch members on the ring gear of the planetary system, and means for optionally engaging the ring gear clutch member with the housing or driving gear clutch members.

14. The combination with a differential gear system of a planetary gear system including a ring gear and having its intermediate gears journaled on the differential casing, a driving gear fixed to the inner gear of the planetary system, a fixed element, clutch members on said fixed element and on said driving gear, a sleeve fixed for rotation with the ring gear of the planetary system, clutch members on said sleeve, and means for optionally engaging the sleeve clutch members with the fixed element or driving gear clutch members.

15. The combination with a differential gear system of a planetary gear system including a ring gear and having its intermediate gears journaled on the differential casing, a driving gear fixed to the inner gear of the planetary system, a housing enclosing both gear systems, clutch members on said housing and on said driving gear, a sleeve fixed for rotation with the ring gear of the planetary system, clutch members on said sleeve, and means for optionally engaging the sleeve clutch members with the fixed element or driving gear clutch members.

16. The combination with a differential gear system of a planetary gear system including a ring gear and having its intermediate gears journaled on the differential casing, and in mesh with its ring gear and inner gear, means for driving one of the two last mentioned gears, and means for optionally holding the other stationary or locking it to said driving means to prevent rotation of the intermediate gears.

17. The combination with a differential gear system of a planetary gear system including a ring gear and having its intermediate gears journaled on the differential casing, and in mesh with its ring gear and inner gear, means for driving one of the two last mentioned gears, a sleeve fixed for rotation with the other, and means for locking said sleeve to said driving means to prevent rotation of the intermediate gears or for holding it stationary.

18. The combination with a differential gear system of a planetary gear system including a ring gear and having its intermediate gears journaled on the differential casing, and in mesh with its ring gear and inner gear, means for driving one of the two last mentioned gears, a sleeve fixed for rotation with the other, a fixed element, clutch members on said fixed element and on said driving means, complementary clutch members on said sleeve, and means for moving said sleeve to engage said fixed element or driving means.

19. The combination with a differential gear system of a planetary gear system including a ring gear and having its intermediate gears journaled on the differential casing, and in mesh with its ring gear and inner gear, means for driving one of the two last mentioned gears, and means for optionally holding the other stationary or locking it to turn with the differential casing to prevent rotation of the intermediate gears whereby the driving means and differential casing are locked together thru the intermediate gears.

20. The combination with a differential gear system of a planetary gear system including a ring gear and having its intermediate gears journaled on the differential casing, and in mesh with its ring gear and inner gear, means for driving one of the two last mentioned gears, an axially movable sleeve fixed for rotation with the other, a fixed element, and means for locking said sleeve with said fixed element to cause planetation of the intermediate gears or locking it for rotation with the differential casing to prevent rotation of the intermediate gears.

In testimony whereof, I have hereunto set my hand at San Francisco, California, this 10th day of April, 1923.

ARTHUR F. BAKER.